UNITED STATES PATENT OFFICE.

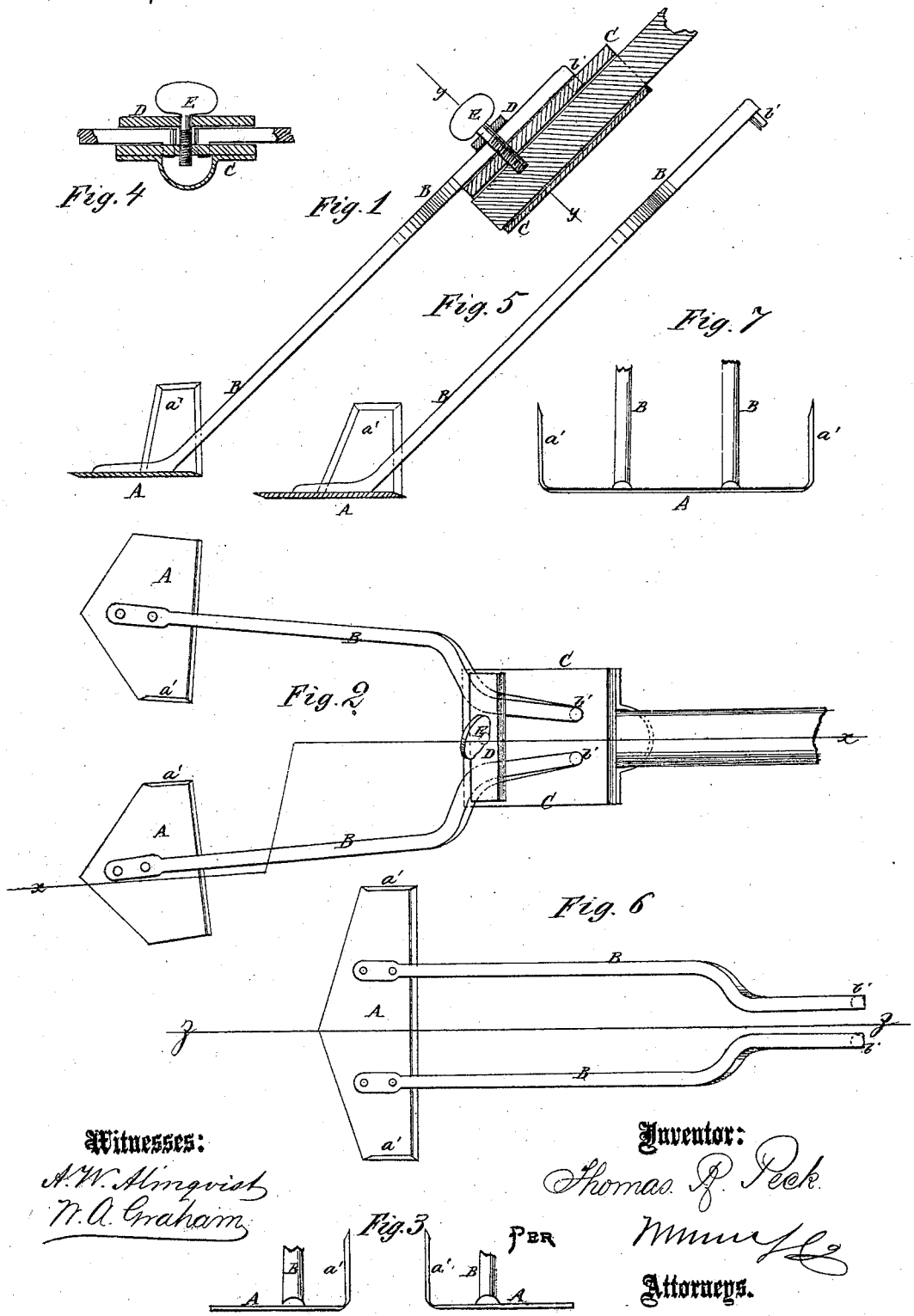

THOMAS R. PECK, OF WATERLOO, NEW YORK.

IMPROVEMENT IN SCUFFLE-HOES.

Specification forming part of Letters Patent No. 131,627, dated September 24, 1872.

*To all whom it may concern:*

Be it known that I, THOMAS R. PECK, of Waterloo, in the county of Seneca and State of New York, have invented a new and useful Improvement in Scuffle-Hoe, of which the following is a specification:

In the accompanying drawing, Figure 1 is detail sectional view of my improved scuffle-hoe taken through the line $xx$, Fig. 2, and Fig. 2 is a top view of the same. Fig. 3 is a front view of the lower part of the same. Fig. 4 is a detail cross-section of the same taken through the line $yy$, Fig. 1. Fig. 5 is a detail sectional view of a modified form of the same taken through the line $zz$, Fig. 6. Fig. 6 is a top view of the same. Fig. 7 is a front view of the lower part of the same.

Similar letters of reference indicate corresponding parts.

My invention has for its object to improve the construction of scuffle-hoes so as to make them more convenient in use and more effective in operation, enabling the hoe to work close up to the plants, and enabling the operator to see just where the end of the hoe-plate is working, so that he need not cut or injure the roots of the plants; and it consists in the construction and combination of various parts of the hoe, as hereinafter more fully described.

A is the hoe-plate, which is made in two parts, as shown in Fig. 2, the inner end of each part being turned upward at right angles, as shown in Figs. 1 and 3, to form upwardly-projecting wings $a'$. The forward edges are made with a salient angle, as shown in Fig. 2. To the middle part of each part of the hoe-plate A is attached the lower end of a shank, B. The upper part of the shanks B are bent inward and have points $b'$ formed upon the under sides of their upper ends to enter holes in the top of the socket C, to which socket the said shanks are secured, adjustably and detachably, by a cross-bar, D, which crosses the upper sides of the said shanks, and is secured in place, clamping the said shanks to the said socket by a hand-screw, E, which passes through the said bar and into the said socket. The screw E is made long, so that it may also serve to secure the socket to the handle. By this construction, by loosening the screw E the parts of the hoe-plate A may be adjusted at any desired distance apart, so that the said parts may work, one upon each side of the row of plants, to clean both sides of the said row at the same time, the wings $a'$ enabling the hoe to work close up to the plants, the ends of said wings $a'$ projecting above the surface of the ground, so that the operator can see exactly where the inner ends of the parts of the plate A may be.

If desired, the hoe-plate A may be made in a single piece, as shown in Figs. 5, 6, and 7, a wing, $a'$, being formed upon each of its ends, and its shanks being secured to the socket C in the manner hereinbefore described. The form of the hoe last described is designed for cleaning the space between two rows.

Having thus described my invention, I claim as new and desire to secure by Letters Patent—

A hoe-shank, B, having point $b'$, socket C, cross-bar D, and hand-screw E, constructed and combined, as and for the purpose described.

THOMAS R. PECK.

Witnesses:
 M. D. MERCER,
 J. B. CROCKER.